United States Patent [19]
Hughes et al.

[11] 3,727,122

[45] Apr. 10, 1973

[54] FIELD MODULATED ALTERNATOR SYSTEM AND CONTROL THEREFOR

[75] Inventors: William L. Hughes; Hansel J. Allison; Ramachandra G. Ramakumar, all of Stillwater, Okla.

[73] Assignee: Oklahoma State University, Stillwater, Okla.

[22] Filed: July 20, 1971

[21] Appl. No.: 164,351

Related U.S. Application Data

[63] Continuation-in-part of Ser. No. 69,675, Sept. 4, 1970, Pat. No. 3,663,945.

[52] U.S. Cl................321/69 R, 321/2, 321/7, 321/18, 321/47, 322/28
[51] Int. Cl..............................................H02m 5/44
[58] Field of Search.................321/2, 4, 7, 18, 321/47, 69 R; 322/28

[56] References Cited

UNITED STATES PATENTS 3,394,298   7/1968   Logan.........................321/2
3,247,444   4/1966   Clarke et al...................321/4
3,386,024   5/1968   Koltuniak et al................321/5
2,911,581   11/1959  Rockafellow...................321/7
3,395,328   7/1968   Huntzinger et al..............321/5

Primary Examiner—William M. Shoop, Jr.
Attorney—James R. Head et al.

[57] ABSTRACT

A polyphase alternator of basic frequency $F_2$ with a field circuit excited with alternating current of frequency $F_1$, and including full wave rectifier means across each phase of the alternator, all connected in additive relation, to provide a pulsating direct current, switching means responsive to the field current to convert this pulsating current to an alternating single-phase current of frequency $F_1$, and capacitors across each phase of the alternator to partially tune the alternator stator windings.

29 Claims, 2 Drawing Figures

PATENTED APR 10 1973

3,727,122

INVENTORS.
WILLIAM L. HUGHES
HANSEL J. ALLISON
RAMACHANDRA G. RAMAKUMAR
BY
*Head & Johnson*
ATTORNEYS

FIELD MODULATED ALTERNATOR SYSTEM AND CONTROL THEREFOR

CROSS REFERENCES TO RELATED APPLICATIONS

This application is a continuation in part of our copending application Ser. No. 69,675, filed Sept. 4, 1970, entitled: Apparatus for Providing AC Electrical Energy At A Preselected Frequency, now U.S. Pat. No. 3,663,945.

BACKGROUND OF THE INVENTION

1. Field of the Invention

This invention is in the field of the electrical generation of power. More particularly it is concerned with the use of alternators of a high frequency $F_2$ to produce power at a selected low frequency $F_1$.

2. Description of the Prior Art

The most common means of generating AC energy is by means of a generator driven by a prime mover. In the United States, and in many other countries of the world, the standard AC power frequency is 60 cycles per second and the electric power generating and power transmitting industry is equipped to transmit AC energy throughout the nation, and other parts of the world, only at this relatively low frequency. It has long been known that the size, and therefore the expense of building a generator to produce a preselected power output decreases as the frequency increases. That is, up to a certain upper limit, a generator to produce a given kilowatt output can be built more economically if it is constructed to operate at a much higher frequency than at 60 cycles per second. Since the standard in the industry, however, has become 60 cycles per second, and since the electric utility companies are geared to produce and distribute energy at 60 cycles only, the use of high frequency generators is not practical.

This invention provides a means of utilizing a high frequency generator to produce a low frequency output. This is one example of the application of the invention. In its broader concept the invention relates to a means of utilizing an AC generator designed for a high frequency output to be adapted to provide AC energy output at any selected lower frequency.

When two AC generators are operated in parallel the speed of rotation of the generators must be synchronized so that the generator outputs are in-phase with each other. This becomes a problem in the utility industry in which the paralleled generating facilities may be physically separated from each other, sometimes by many miles. This invention provides a means of generating electrical energy by means of paralleled rotating AC generators wherein the speed of rotation of the generators does not have to be synchronized.

It is an object of this invention to provide a method and apparatus for operating an AC generator driven by a prime mover such that the frequency output of the generator is variable and independent of the speed of generator rotation. Another object is to provide a method and apparatus of combining field excitation modulation of an AC generator with rectifier means such that the generator output frequency is essentially independent of prime mover speed.

Another object is to provide a means of making the power factor of operation of the high frequency generator independent of the power factor of the low frequency output of the system, thus isolating and preserving the self-exciting and self-regulating characteristics of the generator irrespective of the power factor of the load at the frequency $F_1$.

Another important object is to provide a specific apparatus that will provide a maximum power output of alternating current for a given physical size of the system with minimum input of mechanical power and field excitation power.

SUMMARY OF THE INVENTION

These objects are achieved and furthered and the limitations of the prior art systems are overcome in the system of this invention. The power output of the alternator system is maximized by making the load system reflect a balanced load on each phase winding of the alternator. The resulting armature reaction will then have a minimum effect on the flux distribution in the air gap and the voltage regulation will be improved. To do this requires almost continuous conduction in each phase winding.

The voltage output of each phase on load, is made to have a waveform as nearly rectangular as possible. This is accomplished by connecting full wave bridge rectifiers to each isolated armature phase winding, with the bridge outputs connected in parallel. For this condition, each phase can be made to conduct for almost a complete half cycle, each half cycle. At any given time, all three phases will be supplying current to the output, resulting in a nearly balanced loading, so far as the alternator and its armature reaction are concerned.

The generator under no-load conditions is designed to have a pronounced third harmonic. The stator windings are tuned by connecting proper capacitors across each phase winding. This, combined with the influence of the diode system and the armature reaction under loaded conditions, results in a nearly rectangular wave form for the high frequency voltage outputs of the three phases. Also, the non-sinusoidal nature of the phase voltage increases the ripple frequency in the output wave form and makes it easier to filter out.

The capacitive tuning of the stator windings decreases the excitation requirements for a specified output because of the self-excitation characteristics of the alternator under capacitive load. The power factor of the load supplied at low frequency does not affect the power factor of the generator at the high frequency because the basic frequency $F_2$ is much greater than $F_1$ and also because of the isolation of the generator output from the output of the system provided by the interlying electronic switching system. Since the DC portion of the circuit has no such thing as power factor, it cannot transmit the power factor of the load back to the alternator The generator field circuit is also resonated by connecting a capacitor in series or in parallel with the field winding. This decreases the excitation voltamperes required.

The output of the parallel bridge combination is a full wave rectified sine wave at the modulating frequency $F_1$ of the field current, with some high frequency ripple superimposed.

The zero crossings of the field current are sensed and used to control the triggering of the controlled rectifier bridge that provides the inversion of the rectified current into a single phase alternating current at the frequency $F_1$.

These and other objects and the principles and details of this invention will become apparent from the following description taken in conjunction with the appended drawings, in which:

DESCRIPTION OF THE PREFERRED EMBODIMENT

Figure 1:
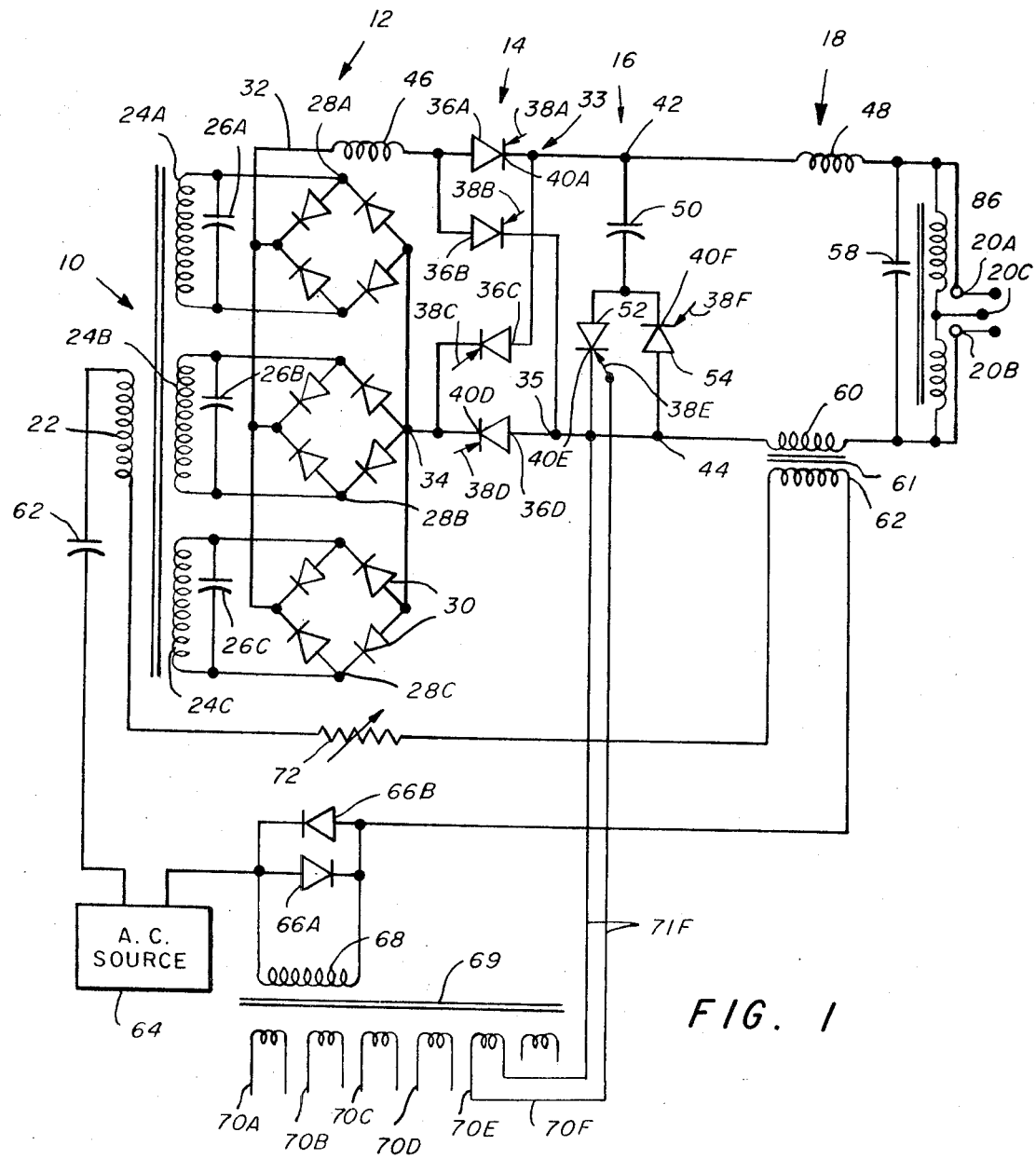
FIG. 1 shows one embodiment of this invention.

Referring now to the drawings, the alternator or generator is represented generally by the numeral 10. The bridge rectifiers are represented generally as 12, the inverters as 14, the snuffing or commutating circuit as 16, and the filtering and transient absorption circuit as 18, respectively.

The alternator comprises a field winding 22 and three separate phase windings 24A, 24B, 24C. Each of the phase windings is insulated from the others and has a capacitor 26A, 26B, 26C respectively across its terminals. Also connected across each phase winding is a full wave bridge rectifier 28A, 28B, 28C respectively, each composed of four diode rectifiers 30 in well known configuration. The three bridge networks 28A, 28B, 28C have their rectified outputs connected in parallel and connected to leads 32, 34 respectively. It will be clear also that the bridge networks can be connected in series instead of in parallel.

The current supplied to the field winding 22 is an alternating current of frequency $F_1$. The alternator (or generator, which terms will be used interchangeably) is designed to provide an output alternating voltage of fundamental frequency $F_2$, when supplied with a direct field current. With an alternating field current, the outputs of the armature windings 24 will be an alternating voltage of basic frequency $F_2$ modulated at the frequency $F_1$. After passing through the full wave rectifiers 12, the voltage at 32, 34 will be a full wave rectified sine wave with some high frequency pulsations.

The next step of this invention is to take this pulsating current and invert every other half cycle to obtain an output of frequency $F_1$. This is accomplished by the four controlled rectifiers 36A, 36B, 36C and 36D connected in conventional bridge circuit, with the unidirectional current input between two terminals 32, 34, and the load circuit connected between the other two bridge terminals 33, 35. The controlled rectifiers 14 can be SCR devices, ignitron rectifiers or other devices, well known in the art. The control of these devices will be described later in connection with the field excitation circuit.

There is next a "snuffer" or commutating circuit 16 which serves to aid the inverter to commutate the input current, so as to provide the AC output to the load. This will be described later. The section of filter comprising inductance 48, transformer 61 and capacitance 58 served to filter the high frequency pulsations resulting from the rectification and addition of the frequency $F_2$ currents. Also, the capacitance 58 serves to minimize the inductive peaks of voltage in the load (if it is inductive), due to the rapid cut-off and reversal of currents in the inverter diodes. The load is connected across terminals 20A, 20B, or between the centertap 20C of the output transformer and either terminal 20A or 20B. A small inductance 46 in lead 32 has been found advantageous in assisting the commutation process in the inverter section 14.

Next, consider the field circuit. A source of alternating voltage of frequency $F_2$, 64 supplies power to the field winding 22. The source 64 can be a rotary alternator, or a static inverter or any conventional source of AC current. A static source would be preferred, however, since with a precise oscillator, the frequency $F_1$ could be held constant. The series capacitance 62 serves to partially tune the field circuit.

There are two other parts of the field circuit. One of these is the transformer 61 with its primary winding 60 connected in series with the load, and its secondary winding 62 connected in series with the field windings 22. The purpose of the transformer 61 is to provide, in effect, a compound alternator in which, as the load current increases, the field current increases, so as to maintain constant output voltage. By the proper design of the alternator and correct choice of the stator and rotor tuning reactances, it is possible to eliminate transformer 61 and achieve self-regulation of the output voltage from no-load to full-load. This requires a capacitance across each stator phase to provide a leading power factor at the high frequency.

The variable resistance 72 in series with the field winding serves as a manual control of the field current, and thus of the alternator voltage.

In the inverting operation, at 14, four controlled rectifiers are used, each of which has a control element (grid or control electrode). The conduction of the controlled rectifiers is thus a function of the anode voltage and of the input to the control element. With suitable positive anode voltage, the rectifier will conduct if the control element has a specified positive voltage with respect to the cathode. Once the rectifier starts conducting, the control element has no further control. Thus it cannot stop the conduction through the rectifier. once started, a current through the rectifier can only be stopped by reducing the anode control to zero, or by passing an equal and opposite current backward through the rectifier to bring the current through the rectifier to zero. If the control element potential is negative when the current through the rectifier drops to zero, then further conduction will be blocked.

In series with the field coil are a pair of diodes 66A, 66B connected back to back. They each pass alternate half cycles of the field current, and develop in the process, a square wave of voltage across their terminals. This square wave of voltage is impressed across the primary 68 of the transformer 69. There are six secondary coils 70A to 70F, each of which is connected between the control electrode 38 and the cathode 40 of one of the six controlled rectifiers 36A–36D, 52, 54. Secondary winding 70E is shown connected by leads 71F to the control grid 38E and cathode 40E of rectifier 52. While not shown, the other five secondary windings are similarly connected.

OPERATION OF THE PREFERRED EMBODIMENT

The purpose of the rectifiers 66 and transformer 69 are to provide pulses at the proper times in synchronism with the field current to initiate conduction in the controlled rectifiers. Consider that the voltage across leads 32, 34 is a pulsating unidirectional full wave rectified voltage, with 32 positive, and with pulsations at the frequencies $2F_1$ and $2F_2$. The object of the inverter 14 is to reverse the voltage to the load in synchronism with the $2F_1$ pulsations, to provide the alternating voltage of frequency $F_1$. Counting zero time as the start of the $2F_1$ pulsations, the operation of the inverter is as follows:

Appropriate positive pulses are provided by secondary windings of transformer 69 to the control elements of controlled rectifiers 36A, 36D and 52. This starts current through 36A through capacitance 50 and rectifier 52, charging capacitance 50 to the maximum voltage across 32, 34. The power current flows through inductance 48, through the load connected between leads 20A, 20B and the output transformer 56 back through rectifiers 36D to junction 34. As the voltage across leads 32, 34 reduces toward zero, at the proper time, the voltages on the control elements 38A, 38D, 38E go negative, and positive voltages are simultaneously applied to control elements 38B, 38C and 38F. When rectifier 54 starts to conduct, the potential across capacitance 50 is applied to the controlled rectifier 36A, which may still be conducting. But the reverse potential across 36A due to capacitance 50 is much higher than the instantaneous voltage across 36A, and the current through 36A is brought rapidly to zero. The current from 50 flowing momentarily through 36A, and through 36B back to 54. Similarly there is a parallel current flowing through 36C and back through 36D, which reduces the forward currents through 36D, to zero, and with the control elements negative, and with the anode voltages negative these controlled rectifiers remain nonconducting.

The potential between 32, 34 now begins to increase and current flows through 36B, through transformer primary 60 through the output transformer and load in reverse direction 20B, 20A, through the inductance 48, through 36C and back to junction 34. In the meantime capacitance 50 has discharged and begins recharging in the reverse direction, that is, with a negative potential at 42.

At the end of this second pulsation a frequency $2F_1$, as the voltage across leads 32, 34 approaches zero, a new set of pulses are generated in 69 which place positive potentials on control elements 38A, 38D, 38E, and negative potentials on control elements 36B, 36C and 36F. Thus while current is still flowing in 36B, 36C, a reverse voltage from capacitance 50 through 52 is applied to commutate these currents to zero, where they are held nonconducting by their negative control elements. At the same time current is initiated through rectifiers 36A, 36D to provide current to load.

Thus the current supplied to the load is an alternating current, whereas the voltage supplied to the inverter is a unidirectional voltage. However, this is a full wave rectified voltage with some high frequency ripple, and the alternating current to the load-filter combination still shows these pulsations in the form of a high frequency ripple. The purpose of the inductance-capacitance network 48, 58 along with transformer 61 is to filter out this ripple and improve the output wave form.

The capacitance 58 also serves to absorb sharp voltage pulses that may be generated due to inductance in the load, as the current through the controlled rectifiers rapidly starts and stops.

The preferred embodiment described in connection with FIG. 1 includes some features which were shown in our copending application Ser. No. 69,675, most of the features of which are applicable to this invention, and are incorporated herein by reference.

Figure 2:
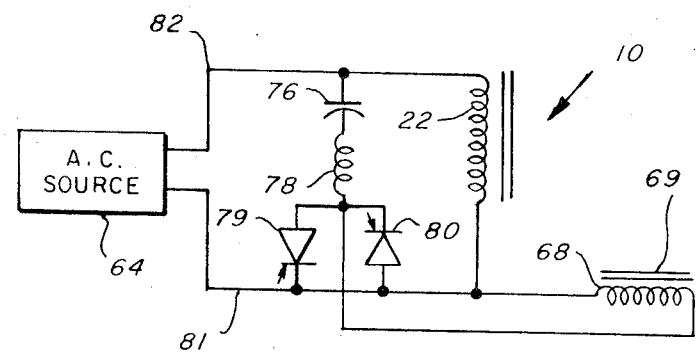
FIG. 2 shows an alternative embodiment of a portion of FIG. 1.

In FIG. 2 is shown a modification of a portion of FIG. 1, namely the field excitation portion. The field circuit in FIG. 1 is a series tuned circuit, and also includes transformer 61 to boost the field current with increase of load.

In FIG. 2, the same source of alternating current 64 is used to supply current to the field coil 22 of alternator 10 via leads 80, 81. There is in shunt across field winding 22 a network comprising in series a tuning capacitance 76, a small inductance 78 to remove high frequency field "hash" from the triggering circuits, and two diode rectifiers 79, 80 back to back. As was the case with diodes 66A, 66B, the voltage across the diodes 79, 80 is a square wave of voltage, which is applied to the primary 68 of the transformer 69. The secondary winding of transformer 69 (not shown in FIG. 2) like those shown in FIG. 1, serve to apply properly timed pulses of voltage to the grids of the 6 controlled rectifiers. The field circuit of FIG. 2 acts in a similar manner as that described in connection with FIG. 1. With a self-regulated design, there may be little need to have the booster transformer in the field circuit.

Experimental work which led to the discoveries which compromise this invention have shown these advances to be extremely effective in reducing energy losses and increasing power output. By the use of the bridge connection of rectifiers across each phase winding and bridges connected in parallel, there is increased usage of the phases for current conduction and therefor greater power output. Also, the tuning of the armature phase windings by capacitors 26 not only improves the efficiency, but, when the capacitance is such as to cause a leading power factor, the generator becomes partially self-exciting. Such tuning is independent of any reactance associated with the load on the frequency ($F_1$) output of the system because of the isolation provided by the electronic switching and filtering circuitry between the generator output and system output. Thus the generator is able to self-excite and to self-regulate in a manner independent of the load power factor and load impedance. The results of these improvements have increased the power output by a factor of 2/1 to 3/1 over the conventional methods. A further improvement has been gained by designing the armature core and windings to generate a larger third harmonic at light load, which will tend to make the phase voltages more nearly square wave under high load. The methods of design for more third harmonic are well known in the art and need not be described further.

The net result of the scheme of connecting the rectifiers as bridges across each of the isolated phase windings of the alternator, with the bridges in parallel is to insure that input voltage to the bridges and the current inputs to the bridges are in phase and that all the phases are supplying current essentially all the time. The current flowing through the machine stator windings will be the instantaneous sum of bridge input currents and capacitor currents, which will then be basically a leading power factor as far as the machine is concerned. Also, the conduction angle of each phase is increased because the inductive current effect is such as to hold the diode bridges open until the inductive current energy stored is released. Almost continuous current conduction in all the three phases of the machine has been obtained by these techniques. This compared to 120° per half cycle with only two of the three windings supplying current at any instant for a conventional three phase, six diode rectifier operating under nearly ideal conditions.

It will be clear, that while the bridge rectifiers are shown as placed directly across the alternator windings, suitable transformers could be interposed, with their primaries connected across the armature phase windings and their secondaries connected to the bridge rectifiers.

The third harmonic component in the stator current is one of the factors in providing long conduction time in each phase, and therefor increased power output. With the third harmonic present, delta connection is disadvantageous since a large circulating third harmonic current will flow. Furthermore in a wye or star connection no third harmonic current can flow since third harmonic voltages cancel across line-to-line. Thus, to retain and use the third harmonic component it is necessary to have isolated phase windings and separate full wave bridge rectifiers across each phase, as illustrated.

Research has indicated also that the presence of large reactance in each phase tends to extend that period of conduction and is therefor beneficial in this process.

The improvements of this invention, such as:
a. splitting out the phases separately,
b. feeding each phase to its own diode bridge rectifier systm,
c. connecting the individual rectifier bridge outputs together in series or parallel,
d. capacitive tuning of the stator and rotor windings, and
e. designing the magnetic circuits to provide square wave outputs, are individually and collectively applicable to many devices, in addition to the frequency down conversion system of this invention.

Among the devices which can be improved by these features are DC-producing rectifier systems on transformers or alternators, including small engine-driven alternators such as those used on automobile and truck engines, etc. However, the most useful application is to field-modulated high frequency alternators to produce low frequency alternating current outputs, and similar devices.

While the bridge rectifier systems have been shown in their preferred form as connected in parallel at three outputs, operation of the system with the bridge outputs in series connection will provide substantially equally good operation. The choice of parallel or series connection is essentially based on the synchronous reactance of the alternator. If this is very low, for example, then the series arrangement should be used, since it provides three times the phase voltage than for the parallel arrangement when the inputs to the three bridges are square wave voltages, and twice the phase voltage when the inputs to the bridges are sinusoidal. If the synchronous reactance is relatively high, the parallel configuration will provide better regulation.

While the invention has been described with some particularity it will be clear that from the principles which have been described, one skilled in the art will be able to devise many other embodiments all of which are considered to be part of this invention which is not to be limited to the abstract, the description or the drawings, but is to have the scope of the appended claim or claims, when construed to the full equivalents of each element.

What is claimed is:

1. In a system for converting electrical energy of basic frequency $F_2$ modulated at a selected frequency $F_1$, where $F_2$ is large compared to $F_1$, into electrical energy of said selected frequency $F_1$, irrespective of changes in the basic frequency, the improvement, comprising:
   a. polyphase alternator means including a plurality of separate phase windings, each of said windings isolated from each other so as to prevent the flow of circulating harmonic currents, said alternator having a field excitation circuit supplied with A.C. power of the frequency $F_1$, the current in said phase windings comprising current of frequency $F_2$ modulated at frequency $F_1$;
   b. first rectifier means for converting said modulated current into a pulsating unidirectional current of full-wave rectified nature;
   c. first controlled switch means adapted to convert said pulsating unidirectional current into an alternating current of frequency $F_1$, each half cycle of which has pulsations of frequency several times the frequency $F_1$;
   d. second controlled switching means for providing timed pulses of current in alternate directions at a frequency of $2F_1$ adapted to aid said first controlled switching means to convert said unidirectional pulsating current to an alternating pulsating current; and
   e. capacitor means across each phase winding to at least partially tune said phase windings.

2. The system as in claim 1 in which said first rectifier means comprises full wave diode rectifier means.

3. The system as in claim 2 in which said full wave rectifier means comprises bridge rectifier means.

4. The system as in claim 1 in which said first controlled switching means comprises at least two controlled rectifier means cooperating with a load means.

5. The system as in claim 4 including at least four controlled rectifier means, in two pairs, one pair adapted to pass current through said load means in one direction, and the second pair adapted to pass current through said load means in the second direction.

6. The system as in claim 4 in which said second controlled switch means comprises for each set of controlled rectifiers:
   a. capacitance means;
   b. means including a first controlled diode means for charging said capacitance;

c. a second controlled diode means to discharge said capacitance in the inverse direction through one of said controlled rectifiers.

7. The system as in claim 1 including capacitive tuning means associated with each of the stator phase windings of said alternator.

8. The system as in claim 7 including a selected inductance in series with each capacitive tuning means.

9. The system as in claim 1 including capacitive tuning means associated with the field of said alternator.

10. The system as in claim 9 including an inductance in series with said capacitive tuning means.

11. The system as in claim 10 in which said inductance is non-linear.

12. The system in claim 1 including means responsive to said field excitation means to control said first and said second controlled switching means.

13. The system as in claim 1 including means responsive to the load current of said system for controlling said field excitation means.

14. The system as in claim 1 and including similar bridge rectifiers means across each phase winding.

15. The system as in claim 14 including means to connect said bridge rectifiers in parallel.

16. The system as in claim 14 including means to connect said bridge rectifiers in series.

17. The system as in claim 14 including capacitive tuning means associated with the stator windings of said alternator.

18. The system as in claim 17 including inductance means in series with each capacitance tuning means.

19. The system as in claim 17 in which each of said capacitive tuning means comprises a capacitance across each stator winding, each of said capacitances large enough to create a leading power factor in each stator winding.

20. The system as in claim 1 including means in said alternator to increase the third harmonic components of the currents in said stator windings.

21. In a system for providing a single phase alternating current of frequency $F_1$, including a polyphase alternator of frequency $F_2$ where $F_2$ is greater than $F_1$, said alternator having a plurality of separate phase windings, and a field excitation circuit supplied from a source of frequency $F_1$ and prime mover means to drive said alternator, the improvement comprising:

a. a plurality of full wave rectifier means, one across each of said plurality of phase windings of said alternator, said phase windings isolated from each other to prevent the flow of circulating harmonic currents;

b. said plurality of full wave rectifier means connected in additive relation to provide a pulsating unidirectional current;

c. first controlled rectifier means for converting said pulsating current into an alternating single-phase current of frequency $F_1$;

d. second controlled rectifier means to provide timed pulses of current at a frequency $2F_1$; and e. means to separately at least partially tune each phase winding of said alternator.

22. The system as in claim 21 in which said full wave rectifier means comprises bridge rectifier means.

23. The system as in claim 21 including means to at least partially tune the field circuit of said alternator to a frequency $F_1$.

24. The system as in claim 21 including means to modify said alternator so as to generate substantially square wave AC voltage in said phase windings.

25. In a polyphase alternator system having a plurality of phase windings, including rectifier means to provide a unidirectional output current, the improvement comprising:

a. the plurality of phase windings electrically isolated from each other to prevent the flow of circulating harmonic currents;

b. substantially identical full wave rectifier means connected across each of said isolated phase windings; and c. the outputs of said full wave rectifier means connected in additive relation, and d. a plurality of capacitances each connected across one of said plurality of phase windings.

26. The system as in claim 25 in which said plurality of rectifier means are connected in parallel at their outputs.

27. The system as in claim 25 in which said plurality of rectifier means are connected in series at their outputs.

28. The system as in claim 25 including means to generate a substantially square wave of voltage in said phase windings.

29. The system as in claim 25 including selected external inductance in series with each phase winding.

* * * * *